United States Patent
Ebling et al.

(10) Patent No.: US 7,383,347 B2
(45) Date of Patent: Jun. 3, 2008

(54) METHOD AND APPARATUS FOR PROVIDING EXTENSIBLE SCALABLE TRANSCODING OF MULTIMEDIA CONTENT

(75) Inventors: Maria Rene Ebling, White Plains, NY (US); Guerney Douglass Holloway Hunt, Yorktown Heights, NY (US); Hui Lei, Scarsdale, NY (US); Gregory Sallmard Stewart, New York, NY (US); Li Xu, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 789 days.

(21) Appl. No.: 09/908,306

(22) Filed: Jul. 18, 2001

(65) Prior Publication Data

US 2003/0018795 A1 Jan. 23, 2003

(51) Int. Cl.
*G06F 13/00* (2006.01)
(52) U.S. Cl. ...................................... 709/232; 370/401
(58) Field of Classification Search ........ 709/230–232; 370/401–405
See application file for complete search history.

(56) References Cited

U.S. PATENT DOCUMENTS

| | | | | |
|---|---|---|---|---|
| 5,398,242 A * | 3/1995 | Perlman | ...................... | 370/256 |
| 5,555,244 A * | 9/1996 | Gupta et al. | ................. | 370/397 |
| 6,131,153 A * | 10/2000 | Takamatsu | .................... | 712/28 |
| 6,185,680 B1 * | 2/2001 | Shimbo et al. | ............. | 713/160 |
| 6,330,229 B1 * | 12/2001 | Jain et al. | .................... | 370/256 |
| 6,345,279 B1 * | 2/2002 | Li et al. | .................. | 707/104.1 |
| 6,415,329 B1 * | 7/2002 | Gelman et al. | ............. | 709/245 |
| 6,523,069 B1 * | 2/2003 | Luczycki et al. | ........... | 709/249 |
| 6,563,517 B1 * | 5/2003 | Bhagwat et al. | ............ | 715/735 |
| 6,674,767 B1 * | 1/2004 | Kadyk et al. | ................ | 370/466 |
| 6,678,250 B1 * | 1/2004 | Grabelsky et al. | .......... | 370/241 |
| 6,701,377 B2 * | 3/2004 | Burmann et al. | ........... | 709/249 |
| 6,810,015 B1 * | 10/2004 | Beyda et al. | ................ | 370/235 |
| 6,850,976 B1 * | 2/2005 | Xia | ............................ | 709/224 |
| 6,938,171 B1 * | 8/2005 | Isomichi et al. | ............ | 713/153 |
| 7,010,536 B1 * | 3/2006 | De Angelo | ................. | 707/100 |
| 2001/0044305 A1 * | 11/2001 | Reddy et al. | ................ | 455/436 |
| 2002/0057678 A1 * | 5/2002 | Jiang et al. | .................. | 370/353 |
| 2002/0108122 A1 * | 8/2002 | Alao et al. | .................... | 725/117 |
| 2002/0143655 A1 * | 10/2002 | Elston et al. | .................. | 705/26 |
| 2003/0093530 A1 * | 5/2003 | Syed | ........................... | 709/226 |

FOREIGN PATENT DOCUMENTS

EP 0811939 4/1997

OTHER PUBLICATIONS

M. Johanson; An RTP to HTTP Video Gateway; Proceedings of the 10th International Conference on World Wide Web (WWW10); pp. 499-503; May 2001.*

(Continued)

*Primary Examiner*—Kenneth R Coulter
(74) *Attorney, Agent, or Firm*—Robert M. Trepp (57) ABSTRACT

A hierarchical gateway system for use in a message delivery system is disclosed, in which each tier of gateways in the hierarchy includes means for transforming incoming messages in a manner required by downstream end-user devices. The hierarchical gateway system has the advantage of being scalable and extensible while avoiding transmission bottlenecks as the number of end-user device types, and their differing system requirements, increase. The invention is operable in the context of a notification server architecture, as well as the Web.

18 Claims, 5 Drawing Sheets

OTHER PUBLICATIONS

J.R. Smith et al., "Content-Based Transcoding of Images in the Internet", 1998 IEEE pp. 7-11 Jan. 1998.

J.R. Smith et al., "Transcoding Internet Content for Heterogeneous Client Devices", Proc. IEEE Inter. Symp. on Circuits and Syst. (ISCAS), Jun. 1998.

Armando Fox et al., "Adapting to Network and Client Variation Using Infrastructure Proxies: Lessons and Perspectives" IEEE Personal Communications, Aug. 1998 pp. 10-19.

U.S. Appl. No. 09/236,622, filed Jan. 29, 1999 "Automatic Data Quality Adjustment to Reduce Response Time in Browsing".

U.S. Appl. No. 09/240,137, filed Jan. 29, 1999 "Systems, Methods and Computer Program Products for Modifying Web Content for Display via Pervasive Computing Devices".

U.S. Appl. No. 09/413,515, filed Oct. 6, 1999, "Method and Apparatus for Transcoding Multimedia Using Content Analysis".

U.S. Appl. No. 09/298,756, filed Apr. 23, 1999, "Methods and Apparatus for Adapting Multimedia content for Client Devices".

A. Fox et al. "Reducing WWW latency and bandwidth requirements by real-time distillation" May 1996 pp. 1445-1456 Comput. Netw. ISDN Syst. (Netherlands) vol. 28, No. 7-11.

M. Hori et al. "Annotation-based Web content transcoding" Jun. 2000 pp. 197-211 Comput. Netw. ISDN Syst. (Netherlands) vol. 33, No. 1-6.

T. W. Bickmore et al., "Digestor: device-independent access to the World Wide Web" Computer Networks and ISDN Systems 29 (1997) 1075-1082 Published by Elsevier Science B.V.

* cited by examiner

METHOD AND APPARATUS FOR PROVIDING EXTENSIBLE SCALABLE TRANSCODING OF MULTIMEDIA CONTENT

BACKGROUND OF THE INVENTION

1. Field of the Invention

The present invention relates generally to communication systems and methods, and more particularly to the communication of messages to one or more devices in an environment in which the devices require that content sent to them be specialized (or transformed) in one or more ways.

2. Description of the Prior Art With

With the proliferation of different types of communication devices comes the need for communication systems that can adapt message content and format to the specific capabilities of a wide array of different end-user devices. This process of adapting a message to the special needs of a target device is known as "transcoding". One system for transcoding is described in U.S. application Ser. No. 09/511,977, filed Feb. 24, 2000 (the "prior application," incorporated herein by reference). As these end-user devices become more pervasive, the demand on network resources for transcoding of messages from the format submitted to the system to a format within the capabilities of the receiving device will become greater and greater. In many cases the receiving device may be one of many different types of devices within a broad class (e.g., PDA's) with each specific type having its own characteristics that differ more or less from those of the other devices within the class and from devices in other classes. Communication systems must be prepared to handle the transcoding of messages for an ever-growing number of different device types while avoiding transmission bottlenecks and limits on scalability.

The present invention improves upon the prior art by providing a hierarchical gateway transcoding technique, for use in systems such as those described in the prior application.

OBJECTS AND SUMMARY OF THE INVENTION

It is an object of the present invention to provide a notification system capable of adapting messages for particular devices in a flexible and scalable fashion.

The present invention improves the communication of messages to an intended recipient(s) of the message by providing a method and apparatus for the efficient, flexible, and scalable transformation of messages sent to specific devices. In a preferred embodiment, the present invention is capable of supporting transcoding in a scalable, extensible, and maintainable manner.

In accordance with one form of the present invention, a notification service, such as that described in the prior application, is provided for communicating messages to one or more intended recipient devices associated with users or subscribers of the notification service. The notification service comprises a notification server operatively connected to one or more gateway hierarchies. Each gateway hierarchy, in turn, is connected, either directly or indirectly via a switching device, to one or more recipient devices associated with a user(s) or subscriber(s) of the notification service.

The gateway hierarchy can be configured to transcode messages into formats successively more similar to the formal format required by the recipient device.

It is to be understood that the present invention contemplates that a message could be intended for any number of recipient users. Without loss of generality, however, the following detailed description is set forth in terms of just a single recipient. Similarly, it is to be understood that a message may need to be delivered to more than one of a particular recipient's devices. Without loss of generality, the following description assumes that just a single device has been identified for delivery of the message.

According to another aspect of the invention, a gateway apparatus, method and program product are provided for use in a hierarchical gateway system, the gateway comprising an input interface configured to receive a message directed to an end-user device; a transcoder coupled to receive the message from the input interface, the transcoder outputting the message after modifying it in at least one manner required by all end-user devices downstream of the gateway; an output interface configured to direct the modified message output from the transcoder to a downstream gateway coupled to a subset of all end-user devices downstream of the gateway, where the downstream gateway is configured to further modify the message in a manner required by all end-user devices in the subset.

These and other objects, features and advantages of the present invention will become apparent from the following detailed description of preferred embodiments thereof, which is to be read in conjunction with the accompanying drawings, wherein like elements are designated by identical reference numerals throughout the several views.

DETAILED DESCRIPTION OF PREFERRED EMBODIMENTS

The present invention is directed to a method and apparatus for the transformation of electronic messages, and more particularly to an efficient, scalable system for transcoding messages sent to end-user communication devices. It is to be appreciated that the present invention is not limited by the form or type of data transmission or end-user device and that those skilled in the art will understand that the form of the data transmission (e.g., RF, wireless, dedicated communications channel, etc.) and the protocol used (e.g., IP, UDP, TCP, WAP, SMTP, HTTP, etc.) may vary while still being within the scope of the present invention.

Figure 1:
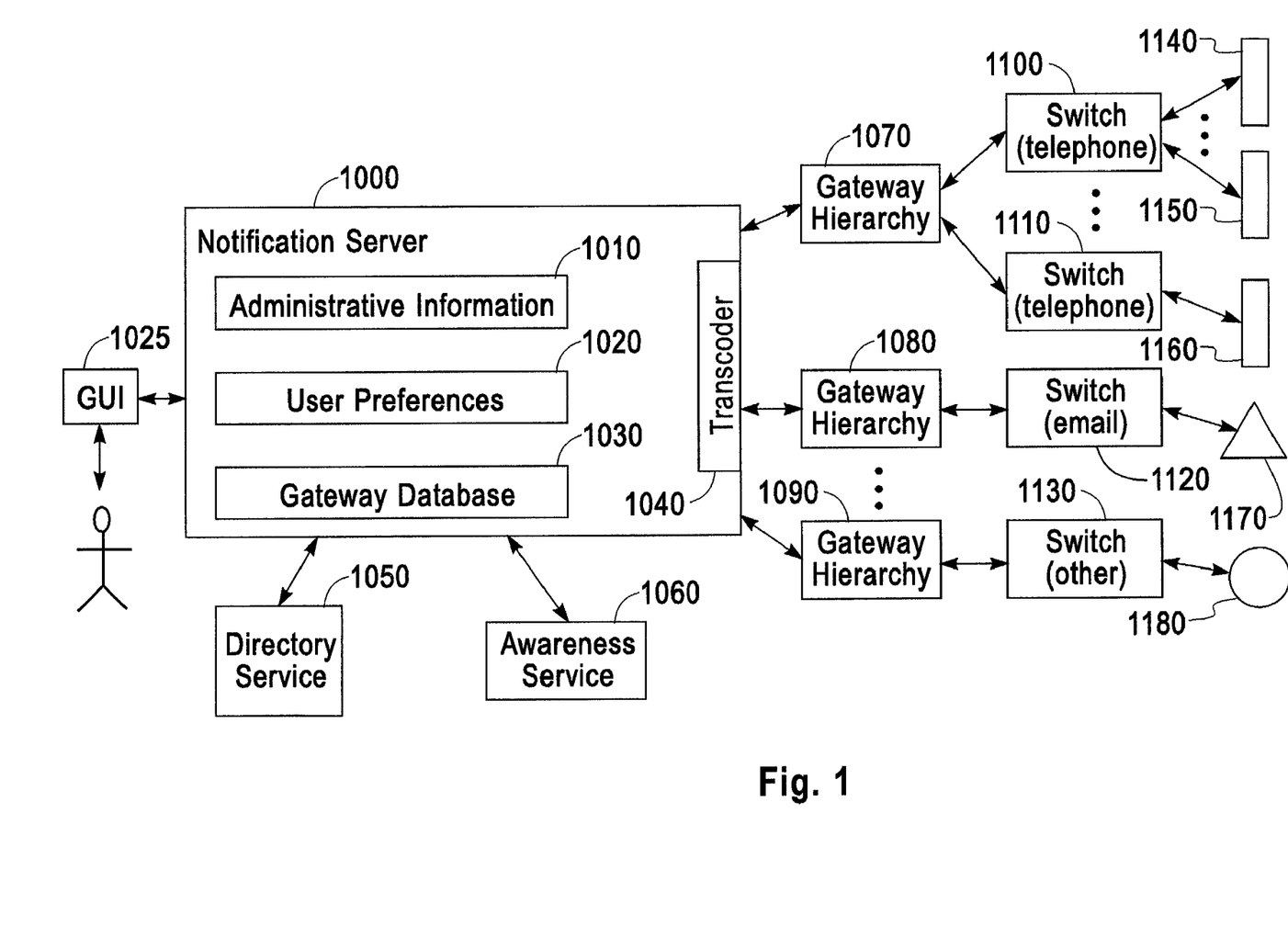
FIG. 1 is a component diagram depicting a notification server system in which the present invention can operate, formed in accordance with one embodiment of the present invention.

The present invention may be more fully understood with reference to FIG. 1, which illustrates the components of an overall notification service architecture in which a preferred embodiment of the invention can operate. As shown in FIG. 1, a notification server 1000 preferably includes a database containing administrative information 1010. This administrative information may include, for example, a list of service subscribers. The information maintained in this database might also include, but is not limited to, user identifiers, passwords and encryption keys. This administrative database 1010 is preferably a logical database and could be realized as one or more physical data stores. The one or more physical data stores that implement the functionality of the logical administrative database 1010 may be implemented in any number of ways, including a formal database or a flat file. Although the administrative database 1010 is depicted as being included within the notification server 1000, the present invention similarly contemplates that the administrative database 1010 may be external to the notification server 1000, such as within a different server or located on a different computer system.

FIG. 1 further depicts a preferences databases 1020 included in the notification server 1000. This preferences database 1020 preferably maintains the preferences of the service's subscribers or users. The preference information includes the identities of those parties that can send subscribers messages. Those skilled in the art will appreciate that preferences database 1020 may be combined with the administrative functionality described previously (similar to how a UNIX (UNIX is a trademark of The Open Group) password file maintains each user's preferred shell). The preferences database 1020 may be modified by the user or by an application program through the use of, for example, a graphical user interface 1025, although the method of modifying the preferences database 1020 may vary and is not limited to graphical user interfaces. Furthermore, it is to be appreciated that the present invention supports user preferences that could potentially change frequently. Although the preferences database 1020 is depicted as being included within the notification server 1000, the present invention similarly contemplates that the preferences database 1020 may be external to the notification server 1000, such as within a different server or located on a different computer system.

FIG. 1 also depicts a gateway database 1030. The gateway database 1030 preferably maintains information about the various gateways accessible to the notification service for use in delivering electronic messages. This information might include, but is not limited to, the types of devices supported by various gateways, service identifiers (to identify this notification service to the gateway service), gateway identifiers to identify the appropriate gateway to which a particular message must be sent to reach a given destination, passwords and encryption keys. It is to be appreciated that this gateway database 1030 is preferably a logical database, and may be realized as one or more physical data stores. The one or more physical data stores that implement the functionality of the logical gateway database 1030 may be implemented in any number of ways, including a formal database or a flat file, and may optionally be located outside the notification server 1000, such as within another server, or located on a different computer system. In an alternative configuration, the logical gateway database can be combined with administration information database 1010. Although the gateway database 1030 is depicted as being included within the notification server 1000, the present invention similarly contemplates that the gateway database 1030 may be external to the notification server 1000, such as within a different server or located on a different computer system.

With continued reference to FIG. 1, there is also shown a transcoder 1040 which is preferably used to transcode electronic messages prior to transmission to the gateway hierarchy. The transcoding performed by transcoder 1040 might include, but is not limited to, removing images, modifying images, removing attachments, summarizing content, removing confidential material, summarizing information about the message (e.g., name of sender, date sent, subject, etc.) and the like. For discussions of transcoding, see A. Fox et al., "Adapting to network and client variation using active proxies: Lessons and perspectives", IEEE Personal Commun., vol. 40, 1998; A. Fox et al., "Reducing WWW latency and bandwidth requirements by real-time distillation", Proc. Intl. WWW Conf., Paris, France, May 1996; T. W. Bickmore et al., "Digestor: Device-Independent Access to the World-Wide Web", Proc. 6th Int. WWW Conf., Santa Clara, Calif., 1997; M. Hori et al., "Annotation-Based Web Content Transcoding," The International Journal of Computer and Telecommunications Networking, Vol. 33, pp. 197-211, Elsevier, May 2000; and J. R. Smith et al., "Content-based transcoding of images in the Internet", IEEE Intl. Conf. on Image Processing (ICIP), Chicago, Ill., October 1998. In furtherance of the goal of a scalable notification architecture, the transcoding operations performed by transcoder 1040 would, in a preferred implementation of the invention, perform only that transcoding required for delivery/receipt by devices of all types. That is, transcoder 1040 would perform operations on outgoing messages only if such operations are required by all receiving devices. In this way the size and complexity of transcoder 1040 can be minimized since it need not contain any information not required by all downstream devices, while deferring device-specific transcoding to downstream transcoders. In addition, the present invention reduces the maintenance requirements for transcoder 1040, since it need not be updated for every new device added to the communication system. However, because of the varying system requirements of different end-user devices, transcoding by transcoder 1040 alone would not be sufficient to ensure that all messages could be delivered to and processed by the intended end-user device.

FIG. 1 further shows the notification server connected to two other services, namely, a directory service 1050 and an awareness service 1060. The directory service 1050 preferably provides information to the notification service regarding the devices available to a particular subscriber, the characteristics of those devices, and their device identifiers (e.g., telephone number or e-mail address, including service provider id). The directory service 1050 could be provided by a Lightweight Directory Access Protocol database or other common directory service or database. The awareness service 1060, such as that described in commonly owned and co-pending U.S. patent application Ser. No. 09/479,821, filed on Jan. 7, 2000, provides, among other things, information regarding the current accessibility of the devices available to a particular subscriber. Although the directory service 1050 and awareness server 1060 are depicted as being external to the notification server 1000, the present invention similarly contemplates that they may be internal to the notification server 1000.

FIG. 1 further depicts a number of connections to gateway hierarchies 1070, 1080 and 1090 via an appropriate communication network (e.g., the Internet). The gateway hierarchy in accordance with the present invention will be described in further detail with respect to FIG. 2b. In FIG. 1, gateway hierarchy 1070 is connected to a telephone network, gateway hierarchy 1080 is connected to a downstream e-mail service network, and gateway hierarchy 1090 is connected to an appropriate communication service which will depend on the particular class of end-user device. Each of the gateway hierarchy services 1070, 1080 and 1090 is, in accordance with the invention, a gateway service such as that illustrated in more detail in FIG. 2*b*. FIG. 1 also shows each gateway hierarchy connected to one or more switches, 1100, 1110, 1120 and 1130 via a corresponding network (e.g., the telephone network in the case of telephones as end-user devices). These switches, 1100, 1110, 1120 and 1130, if employed, preferably provide network connectivity to particular devices. These switches may, for example, correspond to the switch elements designated by reference numerals 31 and 41 in U.S. Pat. No. 5,928,325, incorporated herein by reference. Finally, end-user devices 1140, 1150, 1160, 1170, and 1180 are shown connected to their respective switches via an appropriate communication network.

It is to be appreciated that the present invention contemplates that a device may also be connected via an appropriate network directly to a gateway hierarchy, in which case the switch may be eliminated. The switches are in a unique position to report information regarding the devices they service to other parties, such as to awareness service 1060. Additional gateway hierarchies can be added for use with the present invention as new network types and/or topologies are developed. In addition, it is to be appreciated that if multiple networks have the same or similar characteristics, they could be handled by a single or common gateway hierarchies.

The notification server 1000 preferably includes a central processing unit (not shown) which, in conjunction with other related functional subsystems (e.g., memory, control unit, etc., any of which could be located on different servers on a network), is capable of running an application program for controlling one or more aspects of the notification server. For example, the central processing unit may be used for controlling access to any of the database information described above, transforming message data (e.g., transcoding), communicating with services associated with the notification service (e.g., directory service 1050, awareness service 1060, etc.), interfacing with users, or transmitting messages to the gateway hierarchies 1070, 1080, 1090.

Figure 2A:
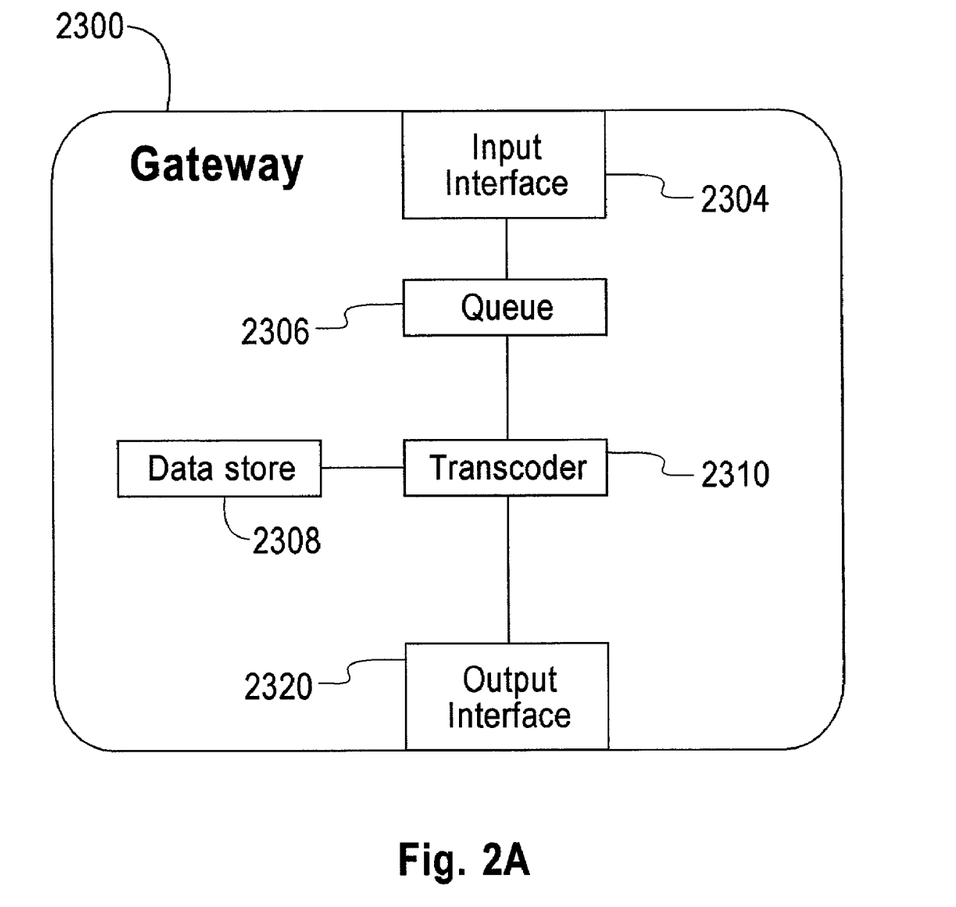
FIG. 2a is a functional block diagram of a gateway for use in a hierarchical gateway arrangement in accordance with the invention.

Referring to FIG. 2*a*, an individual gateway will now be described. The individual gateway is an example of the gateways used to form a hierarchy of gateways in accordance with the invention, as described more fully in connection with FIG. 2*b*.

A gateway 2300 includes an input interface 2304 for receiving messages from upstream system components. Depending upon the gateway's position in the hierarchy, the input interface can receive messages from an upstream gateway, or from notification server 1000. The input interface passes the incoming message to a message queue 2306, which stores outstanding message delivery requests as they are received, on a FIFO basis. One skilled in the art will recognize that these requests may be stored and processed in any order, including, but not limited to, LIFO, size, priority, and cost. For example, there may be a program that looks at the content (e.g., the indicated urgency of the message, particular key words in the message, or the identity of the sender of the message) and delivers based upon that rather than based upon the time of arrival. Gateway 2300 also includes a data store 2308, which stores detailed information regarding the characteristics of a particular device (or class of devices) located downstream of the gateway. The detailed information may include a number of regular expressions. Transcoder 2310 receives incoming messages from the message queue, and performs transformations on the message depending on the identity of the end-user device to which the message has been directed. To determine the appropriate transformations, the transcoder 2310 reads regular expressions stored in data store 2308, and applies the regular expressions to the incoming message. The regular expressions are designed to perform those modifications to the incoming message required in common among all end-user devices downstream of gateway 2300. After the message has been transcoded, it is passed to output interface 2320, which then places the message in a protocol suitable for passing the message either to a downstream gateway within the hierarchy, or to an end-user device or to the switch. For instance, if the message is to be delivered via a telephone call, the system uses a standard software package to place the call and do the text-to-speech translation; if the message is to be delivered via e-mail, it is transmitted in SMTP; and if it is intended for a WAP-enabled cellular phone, it is transmitted in the Wireless Access Protocol. Further details on the function and operation of gateway 2300 can be found in the prior application.

Figure 2B:
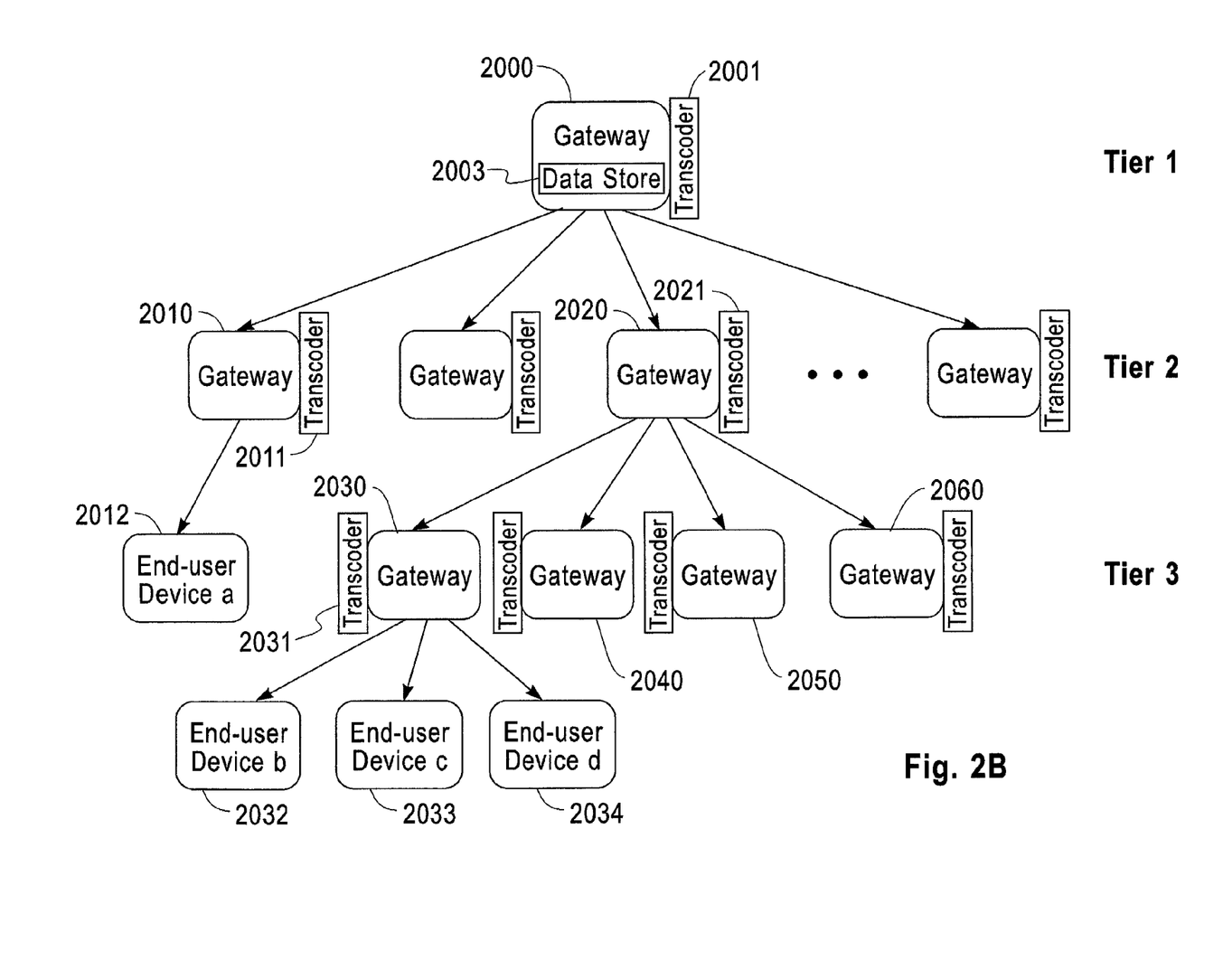
FIG. 2b is a component diagram depicting a hierarchical gateway arrangement in accordance with the invention.

With reference to FIG. 2*b*, a hierarchical gateway in accordance with the invention will now be described. A gateway hierarchy in accordance with the invention will include one or more tiers of gateways, each individual gateway being like the gateways in FIG. 2*a*.

The hierarchical gateway of FIG. 2*b* is a generalized view of one of hierarchical gateways 1070, 1080, and 1090 of FIG. 1, and includes, for purposes of explanation only, three levels of gateways. Each gateway can, for example be operating as a separate process on its own machine, as multiple processes operating on two or more machines, or as part of a single process on a single machine. The example shown in FIG. 2*b* is illustrative, and a system in accordance with the invention can include any number of tiers, and any number of gateways per tier. In accordance with the invention, each gateway can support an arbitrary number of devices, and an arbitrary number of gateways, or both.

In accordance with the invention, gateway 2000 will receive a message via an appropriate network, e.g., the Internet, which message, in a preferred embodiment, will have been partially transcoded so as to possess certain characteristics common to all end-user devices served by the parent of gateway. Such transcoding may have been performed, for instance, in Notification Server 1000. In an alternative embodiment, no transcoding or only partial transcoding will have been performed on the message prior to receipt by gateway 2000.

Gateway 2000 includes a transcoder 2001 which performs a further transcoding operation on the message, preferably so as to modify the message to possess those characteristics common to all end-user devices of the type supported by gateway 2000 (e.g., a-d of FIG. 2*b*).

The transcoder 2001 provides device-specific (or device class specific, if at a higher level of the hierarchy) transcoding. Such transcoding may require detailed information regarding the characteristics of a particular device (or class of devices) which is stored in data store 2003, which can be a hard-coded data store or an updatable database. In accordance with one beneficial aspect of the invention, transcoding engine 2001 may, but need not, support variations between different models of the same device, nor must it possess detailed knowledge about all the device types serviced by a specific gateway, such as the characteristics of each different model of a family of devices (e.g., the Palm I, II, III, V, VII devices of the Palm family of connected organizers (Palm is a trademark of Palm, Inc.)). An important advantage of this unique approach is the increased scalability that is possible when device-specific transcoding is performed by gateways logically closest within the hierarchy to the end-user devices they service. This reduces the size of device information data stores for transcoders throughout the system, while also reducing processing bottlenecks because no single gateway must transcode messages for all possible recipients. In addition, the system of the present invention preferably supports adding new devices or device types, with minimal reconfiguration or impact on the notification server design, since the detailed device information need not be added to the complex body of code included in the notification server, but rather only to an appropriate gateway in the hierarchy.

After transcoding in gateway 2000, the message will be provided to the appropriate level 2 gateway, depending on the target end-user device. For example, if the message is destined for end-user device a 2012, the message will be routed to gateway 2010 via the appropriate network, where it may be further transcoded by transcoder 2011 such that the message will be in a format approved for end-user device a 2012. If, instead, the message leaving gateway 2000 is destined for end-user devices b 2032, c 2033, or d 2034, the message will be routed to gateway 2020, where it will be transcoded by transcoder 2021 in a manner such that the message will possess certain characteristics required commonly by end-user devices b 2032, c 2033, and d 2034, as well as those devices serviced by gateways 2040, 2050, and 2060. Taking the example where the message is bound for end-user device b 2032, gateway 2020 passes the message after transcoding by 2021, via the appropriate network, to gateway 2030, where it is further transcoded by transcoder 2031 such that it possesses the characteristics required by end-user device b 2032.

When transcoding in the final gateway level for a given end-user device has been performed, the filly transcoded message is forwarded to the end-user device via the appropriate network and switch (such as 1100, 1110, 1120, and 1130 in FIG. 1).

In other embodiments within the scope of the invention, the transcoding performed at any level of the hierarchy can be all, more, or less than all transformations necessary to modify the message such that it possesses all characteristics common to downstream end-user devices. It may be the case that system implementers will find it more appropriate to move certain transcoding functions to gateways nearer the end-user device and therefore not perform all possible transformations that would put messages in a condition where they possess all common downstream characteristics. In other implementations, it may be beneficial to move transcoding functions further upstream than efficiency considerations would otherwise dictate.

In still other embodiments of the invention, the message received by the gateway hierarchy will not have been transcoded by the notification server 1000, in which case all transcoding is left to the hierarchical gateway.

Figure 3:
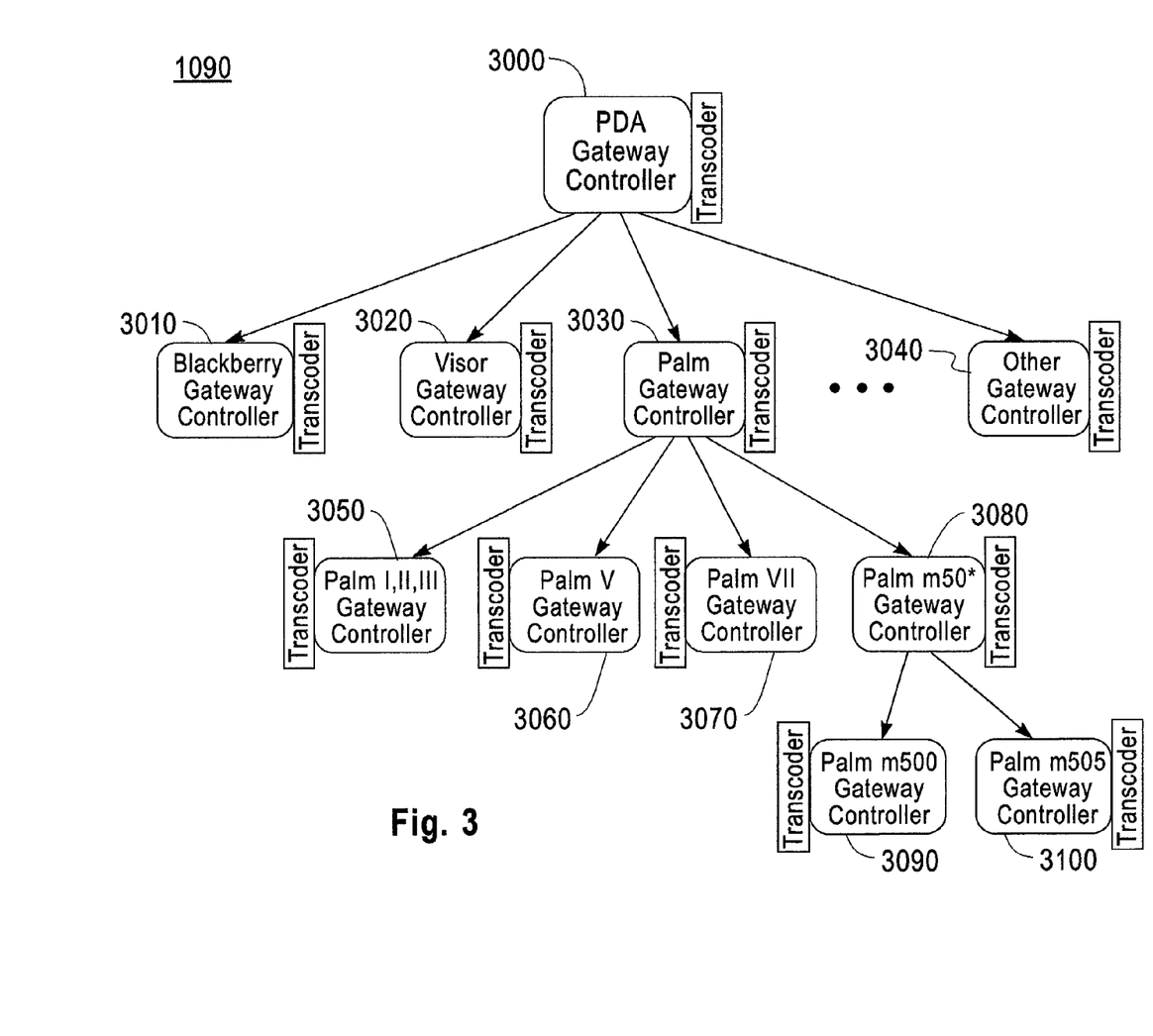
FIG. 3 is a component diagram depicting a gateway hierarchy for personal digital assistant (PDA) devices, formed in accordance with one embodiment of the present invention.

FIG. 3 illustrates a particular implementation of a hierarchical gateway such as the one shown in FIG. 2b. In this example, the hierarchical gateway might correspond to hierarchical gateway 1090 of FIG. 1. In hierarchical gateway 1090, gateway 3000 is provided that includes a transcoder configured to handle transforming messages intended for personal digital assistants (PDAs). The PDA transcoder for gateway 3000 would perform, in this embodiment, any transformations required for all PDAs before handing the message to a device-specific gateway, such as the BlackBerry Gateway Controller 3010 (BlackBerry is a trademark of Research In Motion Limited), the Visor Gateway Controller 3020 (Visor is a trademark of Handspring, Inc.), the Palm Gateway Controller 3030, or some other device-specific gateway controller 3040. The transcoder in each device-specific gateway (3010, 3020, 3030, or 3040) would perform any transformations required for all PDAs of that specific type. For example, the transcoder in Palm Gateway Controller 3030 might filter out audio data, using any known process, if none of the Palm PDAs are capable of handling audio data. Once the transcoder had completed any transformations common to all devices of the specified type, its gateway would hand the message off to, for example, a model-specific controller. In the case of the Palm Gateway Controller 3030, the system might hand the message to the Palm I, II, III Gateway Controller 3050, the Palm V Gateway Controller 3060, the Palm VII Gateway Controller 3070, or the Palm m50* Gateway Controller 3080. Each of these controllers would handle any transformations for their particular model. In the case of the Palm m50* Gateway Controller 3080, it would handle any transformation common to the m500 and m505 models and then hand the message off to the Palm m500 Gateway Controller 3090 or the Palm m505 Gateway Controller 3100. Note also that it may be desirable in some situations to design the hierarchical system such that a gateway at higher level in the hierarchy nevertheless may perform transcoding operations necessary only for a subset of those end-user devices downstream of such gateway. Thus, for example, if a particular message received by Palm m50* Gateway Controller 3080 is bound for a Palm m505 end-user device (via Palm m505 Gateway Controller 3100), the system might be configured to perform transcoding operations on the message that are common to all downstream devices, but also operations that are peculiar only to the Palm m505 device.

Figure 4:
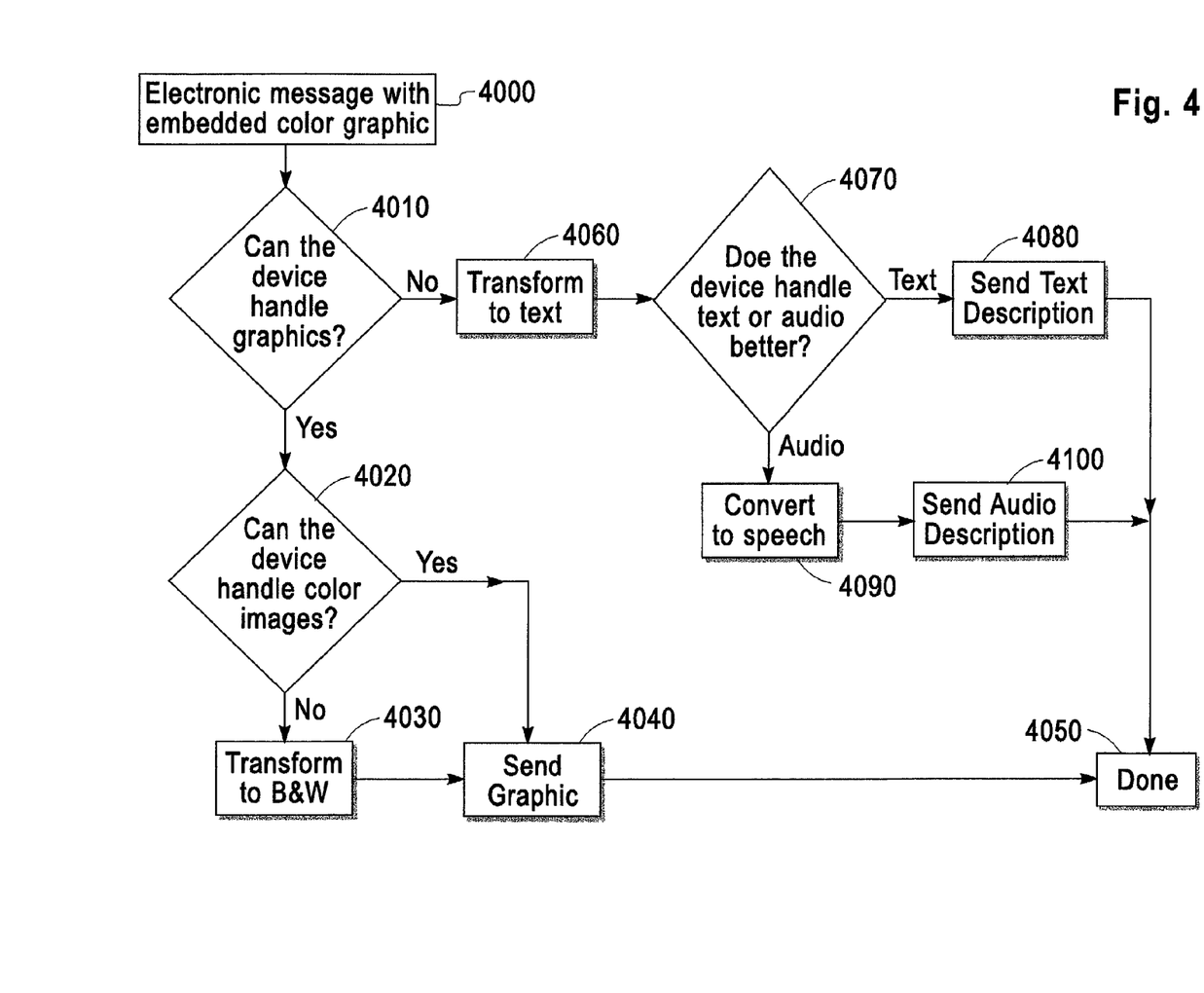
FIG. 4 is a logical flow depicting the steps performed by a gateway hierarchy to transform a message for delivery to a particular device, in accordance with one embodiment of the present invention.

FIG. 4 illustrates a logical flow diagram of the process of transcoding a message for a particular device. The example is directed to the particular embodiment of FIG. 3, although the process can be generalized to perform transcoding operations for other types of devices.

The process in FIG. 4 begins once a message is received by a gateway and the end-user device is identified and its capabilities are known. This information can either be hardcoded into the gateway, i.e., data about devices can be coded directly into the transcoding program, or kept in a knowledge database accessible by the gateway, or passed to the gateway with the message. One skilled in the art will recognize that this information may be obtained in different ways by different gateways in the hierarchy. With reference to FIG. 3, upon receipt of a message 4000 containing an embedded color graphic, the system determines 4010 whether or not the intended recipient device is capable of receiving and displaying said graphic image. If it is, the system then determines 4020 whether or not the device is capable of displaying a color representation of that image. If so, the system sends 4040 the message unchanged to the next downstream component, which may be another gateway in the hierarchical gateway system, or the intended end-user device. If the device is only capable of displaying black and white images, then the system first transforms 4030, using any known process, the image to a black and white (or grayscale) representation before sending the graphic 4040. If the device is not capable of displaying images at all, then the message is transformed 4060, using any known process, to a text-only message (perhaps with the assistance of a program that interprets a graphic image textually). The system then determines 4070 whether or not the device (or end user) handles text or audio better (by checking device capabilities) and the user's preference for text messages vs. audio messages, if the device is capable of both). If the device handles text messages better, then the system sends the text message 4080 representation. Otherwise, if the system handles audio messages better than text (or if the user prefers audio to text on this particular device), then the system converts 4090, using any known process, the text message to speech using a text-to-speech processor. It then sends 4100 this audio message.

One skilled in the art will recognize that this architecture is flexible and could be applied, as appropriate, recursively through any number of tiers, depending upon the needs of the particular devices served by the high-level gateway.

It is important to note that the processes carried out by a gateway of the present invention is capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

Furthermore, although the invention has been described in particular in the context of a notification server architecture, those skilled in the art will recognize that the invention can be implemented over the World Wide Web and other Internet architectures.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A gateway for use in a hierarchical gateway system, the gateway comprising:

an input interface configured to receive a message directed to an end-user device;

a transcoder coupled to receive the message from the input interface, the transcoder outputting a modified message after modifying message content by transcoding in at least one manner required by all end-user devices downstream of the gateway by determining required transcoding based on information describing characteristics of the end-user devices downstream of the gateway to allow all end-user devices downstream of the gateway to receive and display the message content and modifying message content by at least one of removing at least one of image and audio content from the message, modifying at least one of image and audio content in the message, removing attachments from the message, summarizing message content, removing confidential material from the message and summarizing information about the message; and an output interface configured to direct the modified message output from the transcoder to a downstream gateway coupled to a subset of all end-user devices downstream of the gateway, where the downstream gateway is configured to further modify the modified message by transcoding in a manner required by all end-user devices in the subset.

2. The gateway of claim 1, wherein the transcoder includes a data store that stores information describing certain characteristics of the end-user devices downstream of the gateway.

3. The gateway of claim 2, wherein the data store is a database that can be updated to store information on an arbitrary number of end-user devices downstream of the gateway.

4. The gateway of claim 2 wherein the data store is a hardcoded data storage device.

5. The gateway of claim 1, wherein the transcoder is designed to modify the message to provide a modified message that includes all characteristics common to the end-user devices downstream of the gateway.

6. The gateway of claim 1, wherein the transcoder is designed to modify the message to provide a modified message that includes only a subset of all characteristics common to the end-user devices downstream of the gateway.

7. The gateway of claim 6, wherein the transcoder is also designed to modify the message such that the modified message includes characteristics peculiar only to the end-user device to which the message is directed.

8. The gateway of claim 1, wherein the message received by the gateway has been partially transformed by an instrumentality upstream of the gateway to include one or more characteristics common to the end-user devices downstream of the gateway.

9. The gateway of claim 1, wherein the gateway and the downstream gateway are separate processes running on the same machine.

10. The gateway of claim 1, wherein the gateway and the downstream gateway are separate processes running on different machines.

11. The gateway as claimed in claim 1 wherein said transcoder further comprises a determining component for determining required transcoding for said end-user devices.

12. A method for transcoding a message received by a gateway that is directed to an end-user device, the method comprising:

receiving, at the gateway, a message directed to an end-user device;

modifying the message content in at least one manner required by all end-user devices downstream of the gateway by transcoding said message to provide a modified message by determining required transcoding to allow all end-user devices downstream of the gateway to receive and display the message content based on information describing characteristics of said end-user devices downstream of the gateway and modifying message content by at least one of removing at least one of image and audio content from the message, modifying at least one of image and audio content in the message, removing attachments from the message, summarizing message content, removing confidential material from the message and summarizing information about the message; and directing the modified message to a downstream gateway coupled to a subset of all end-user devices downstream of the gateway, where the downstream gateway is configured to further modify the modified message by further transcoding in a manner required by all end-user devices in the subset.

13. The method of claim 12, wherein the message is modified to include all characteristics common to the end-user devices downstream of the gateway.

14. The method of claim 13, wherein the message is further modified to include characteristics peculiar only to the end-user device to which the message is directed.

15. The method of claim 12, wherein the message is modified to include only a subset of all characteristics common to the end-user devices downstream of the gateway.

16. A hierarchical gateway system, comprising:
- a first gateway level including at least one first-level gateway, each first-level gateway including a first-level input interface configured to receive a message directed to an end-user device, a first-level transcoder outputting a modified message after modifying message content by transcoding in at least one manner required by all end-user devices downstream of the first-level gateway, and a first-level output interface for outputting the modified message;
  - at least one successive gateway level including at least two successive-level gateways, each successive-level gateway including a successive-level input interface configured to receive a modified message directed to an end-user device from a previous-level gateway, a successive-level transcoder coupled to receive the modified message from the successive-level input interface, the successive-level transcoder outputting the message after further modifying the modified message content by further transcoding in at least one manner required by all end-user devices downstream of the successive-level gateway, and a successive-level output interface for outputting the further modified message and sending it to either a next successive-level gateway for further transcoding or to the end-user device to which the message is directed,
- wherein modifying message content by transcoding comprises determining required transcoding to allow all end-user devices downstream of the gateway to receive and display the message content based on information describing characteristics of the end-user devices downstream from the respective transcoder and modifying message content by at least one of removing at least one of image and audio content from the message, modifying at least one of image and audio content in the message, removing attachments from the message, summarizing message content, removing confidential material from the message and summarizing information about the message.

17. The system of claim 16 wherein each successive gateway level comprises device-specific transcoders.

18. A computer program product in a computer readable storage medium for use in transcoding messages received by a gateway and directed to an end-user device, the computer program product comprising:
- first instructions for receiving a message directed to an end-user device;
- second instructions for modifying the message content in at least one manner required by all end-user devices downstream of the gateway by transcoding said message to provide a modified message by determining required transcoding to allow all end-user devices downstream of the gateway to receive and display the message content based on information describing characteristics of said end-user devices downstream of the gateway and modifying message content by at least one of removing at least one of image and audio content from the message, modifying at least one of image and audio content in the message, removing attachments from the message, summarizing message content, removing confidential material from the message and summarizing information about the message; and
- third instructions for directing the modified message to a downstream gateway coupled to a subset of all end-user devices downstream of the gateway, where the downstream gateway is configured to further modify the modified message by further transcoding in a manner required by all end-user devices in the subset.

* * * * *